PLUG IN JACK TO BARE WIRE MULTIPLE

Filed May 15, 1951

INVENTORS
George P. Martin,
BY James M. Blackhall,
Brown, Jackson, Boettcher & Dienner
Att'ys.

United States Patent Office 2,742,534

Patented Apr. 17, 1956

2,742,534

PLUG IN JACK TO BARE WIRE MULTIPLE

George P. Martin, Kenton, and James M. Blackhall, Galion, Ohio, assignors to North Electric Company, Galion, Ohio, a corporation of Ohio Application May 15, 1951, Serial No. 226,373

15 Claims. (Cl. 179—27.54)

This invention relates in general to automatic telephone apparatus, and in particular to a novel plug-in-jack equipment for effecting the completion of multiple circuit connections to bare wire members in a telephone exchange.

Conventional all-relay type telephone systems are comprised of a series of relay members interconnected as switches for extending communication links between the various subscribers of the telephone exchange. The switching equipment in most basic exchanges includes so-called line circuit equipment, line finder switches, and connector switches.

The switches are arranged and mounted in basic bays each of which is adapted to serve one hundred lines of subscriber equipment. With normal traffic conditions, fifteen line finder connector links for each one hundred line bay provide satisfactory service .

As shown in detail in the Patent 2,415,437 which was issued to McBerty on February 11, 1947, the line finder and connector links are mounted on support members which are vertically positioned in side by side relationship in a bay of the exchange. Each of the links mount a group of ten units relays and a group of ten tens relays in tandem, the unit relays being mounted at the top and the ten relays below.

Certain of the terminals of the units and tens relays are connected in multiple with corresponding terminals of the relays on adjacent banks by so-called "bare wire multiple members" which extend horizontally in a given plane to contact each of the assigned relay terminals which is disposed in that plane. This particular arrangement is best shown in Figure 11 of the aforementioned patent. All of the bare wire multiples are arranged in coplanar relationship and are mounted in insulated spaced relation by conductor supports and spacers formed of suitable insulating material. Through the use of this particular type of multiple connection, extremely short runs of bare wire conductors may be utilized and an exchange bay of comparatively small dimensions is provided. In addition the cost of the exchange is minimized by use of short bare wire multiple runs, the multiples being such as to insure long life, and provide excellent performance by reducing the noise level to one which is far below that of previous known exchanges.

The interconnection of a telephone exchange requires that the bare wire multiples be interconnected with other equipment in the associated bay and also with the exchange main distributing frame. In the past, the cables which were used to effect the connections therebetween were soldered or welded. With such arrangement the soldering or welding attachment must necessarily be done at the point of exchange installation, and considerable interference arises as several persons tend to simultaneously work at this task on the switchboard. Such operation, in addition to being irksome, is time consuming and expensive and a solution to such problem has long been desired.

In the installation of exchange equipment of larger than one hundred lines, the aforementioned horizontal bare wire multiples of the various cabinets in the exchange must be interconnected by means of flexible cables; these connections having necessarily previously been made up, cut to length and soldered in place at the point of installation. As a result confusion and excessive time delays in installation were experienced and provided a definite disadvantage in the use of the bare wire multiples.

It is an object of the present invention to provide a positive acting, firm contact-making, multiple plug-in jack for effecting connection with a series of bare wire multiple conductors. It is a particular object of the invention to provide a multiple contact plug-in jack assembly of the type described which is economical and convenient to manufacture and which is especially reliable and positive in its use in all relay telephone exchanges.

A feature of the invention is the manner in which the cable conductors may be soldered to the plug-in jack at points remote from the exchange bays whereby the exchange installation may be effected by several persons without experiencing any of the interference which is normally encountered when the cable conductors are soldered directly to the horizontal bare wire multiples .

A further feature of the invention is the manner in which the cable conductors which are adapted to extend between the horizontal bare wire multiples of the various cabinets in an exchange may now be soldered to the plug-in-jacket at the factory, whereby the connections at the place of installation merely comprises the simple operation of plugging in the jacks to the horizontal bare wire multiples. Other features and advantages of the novel plug-in-jack will become more apparent with reference to the following detailed description taken in connection with the accompanying drawings in which.

Figures 1, 2, 3, 4:
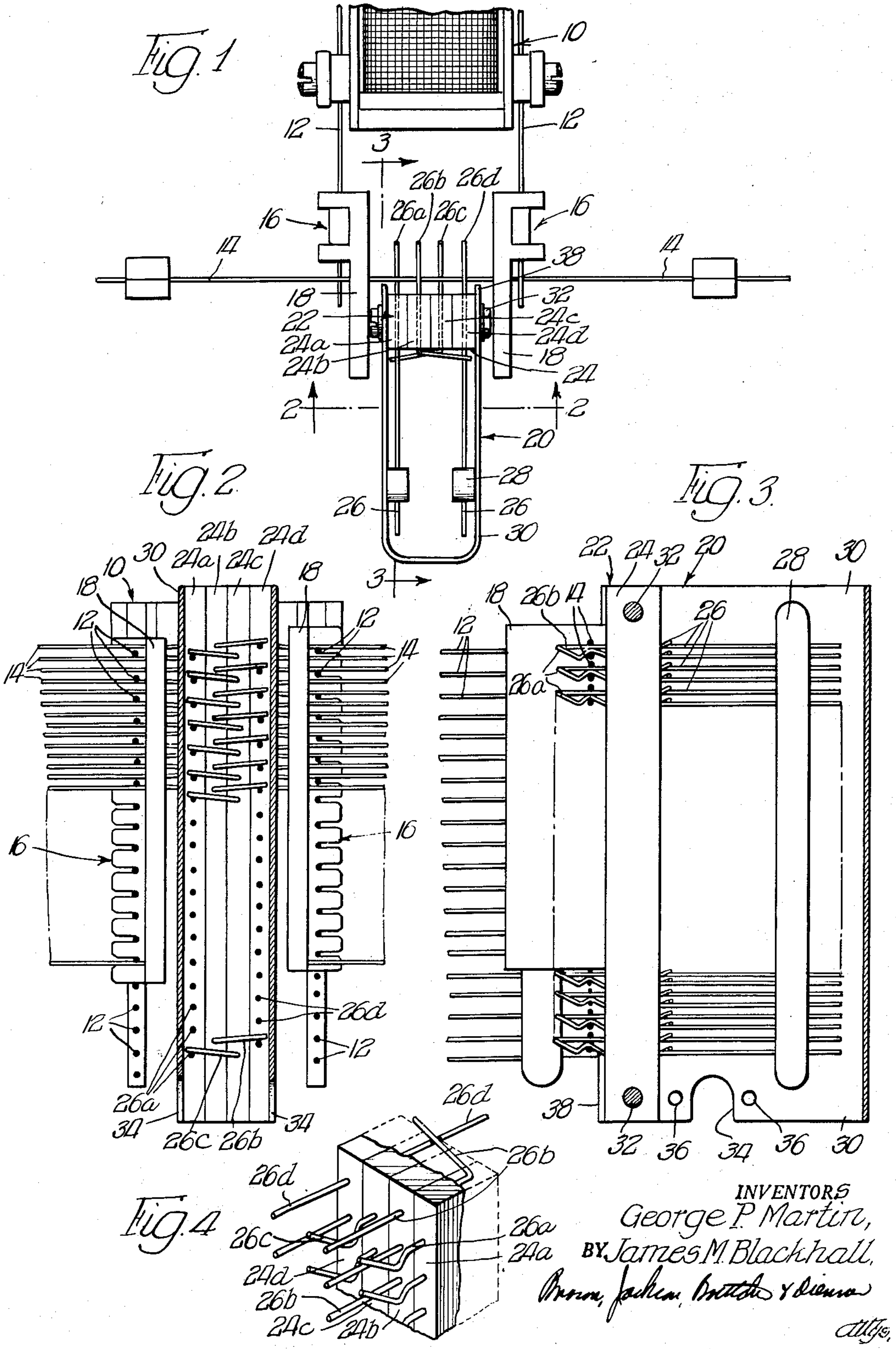
Figure 1 illustrates in a top plan view the novel plug-in-jack assembly as connected to a set of horizontal bare wire multiples in a telephone exchange.
Figure 2 is an end plan sectional view of the plug-in-jack taken along the line of 2—2 of Figure 1.
Figure 3 is a view in side elevation taken along the lines 3—3 of Figure 1.
Figure 4 is a perspective view of the connecting members of the plug-in-jack which cooperate with the bare wire multiples.

Referring now to the drawings, there is shown a conventional type telephone exchange relay indicated generally at 10, and shown in more detail in the aforementioned patent. Relay 10 has a plurality of reed terminals 12 arranged to contact a series of exchange bare wire multiples 14, a firm and positive contact being effected by a novel wedge lock to multiple unit, indicated generally at 16. The wedge lock to multiple is the subject of the copending application, Serial No. 226,374, filed May 15, 1951, by Maurice G. Ryon and Donald S. Baker, which application is assigned to the assignee of the present application.

The wedge lock to multiple 16 includes a pair of spaced wire guides 18 which are wedged to the reed terminals 12 and maintain the bare wire multiples 14 in positive contact with associate ones of the reed members. The plug-in-jacket of the present invention is adapted to be associated with the bare wire multiples 14 anywhere along the length of the multiples, but preferably between adjacent wire guides 18 since firmest support is provided at that point.

The plug-in-jack of the present invention is indicated generally at 20 and comprises a base support 22 which is formed of a series of molding strips 24 of suitable non-conductive material, each of the strips having molded therein a series of reed members 26. The reeds 26 serve to make connection between the multiple bare wire conductors 14 at their forward ends and at their opposite ends provide suitable means for fastening circuit conductors thereto (not shown). The said opposite ends of the reeds protrude rearwardly of the molding strips 24 and are held in insulated spaced relation by molded beads 28 of thermo-plastic material.

The number of connections which may be made by a multiple plug-in jack of the type disclosed is practically unlimited. The embodiment disclosed herein shows a double bank of connectors over which 36 circuits can be established with the connection of the jack assembly to the bare wire conductors. To provide connectors for 36 circuits, the base support 22 is comprised of four separate insulated strips 24, each of which have eighteen wire reed conductors 26 molded therein with portions of the reeds projecting forwardly and rearwardly thereof. The reeds 26 have a spacing of approximately twice the spacing between adjacent bare wire multiples. Alternate ones of the moldings are arranged in pairs for establishing contact with a particular one of the bare wire multiples. Adjacent molding strips are so arranged as to have their wires or reeds off-set a distance approximately equal to the spacing between adjacent ones of the bare wire conductors, whereby alternate molding strips 24 constituting one set of contactors will establish contact with the even ones of the bare wire multiples and the other set or pair of contactors will establish contact with the odd numbered ones of the bare wire multiples.

Referring to the drawing, the four molding strips, *24a*, *24b*, *24c*, and *24d*, are each provided with reeds *26a*, *26b*, *26c*, and *26d*, respectively. The reeds *26a* and *26c* of strips *24a* and *24c* form one pair or set of contactors and the reeds *26b* and *26d* of strips *24b* and *24d* form the other pair or set of contactors. As shown in Figure 2, the reeds *26a* and *26c* contact the second, fourth, sixth, etc., or even numbered bare wire multiples and the reeds *26b* and *26d* contact the first, third, fifth, etc., or odd numbered bare wire multiples, so that two reeds 26 are utilized to contact each bare wire multiple to insure effective contact.

The reed portions extending forwardly from one set of the base moldings, reeds *26b* and *26d* of moldings *24b* and *24d*, are straight or lie in a flat plane, which corresponds to the plane of an associated one of the bare wire multiple conductors. The rearwardly disposed portion of the reeds *26b* of the inner molding *24b* of the pair are bent over at approximately 90° to the axis of the forwardly disposed portion thereof and toward the reeds *26d* of the other molding *24d* of the pair to intersect the corresponding or paired reed *26d*. A firm contact is effected between intersecting reeds *26b* and *26d* by a tension bias placed upon the bent portion of the reeds *26b* and/or by welding the reeds together at their points of intersection. The rearwardly extending portions of the reeds *26c* are bent in a manner similar to the bending of the reeds *26b* and are connected to the paired reeds *26a*, in the same manner as the connection of the paired reeds *26b* and *26d*. As previously stated, the utilization of paired reeds or contactors insures constant and positive contact between the reeds 26 and the bare wire multiples 14. By interconnecting the paired reeds outside the contactor zone, a single terminal is provided for each pair of contacts for ready and convenient attachment of flexible conductors or the like.

The contactor or forwardly projecting portions of the reeds *26a* and *26c* of the other set of moldings are approximately S-shape in contour, the leading or forward edge of each reed being inclined from the plane of the reed to facilitate contact along a sliding plane with the associated one of the bare wire multiple conductors. Immediately inward from the inclined leading edge, each reed is provided with oppositely inclined portions to form a detent or locking portion and a groove within which the respective bare wire multiple is received to lock the plug-in jack to the multiples. The disposition of the various portions of the S-shape is such that the multiples will be forced out of their normal planes of disposition by the leading edge of the reeds and retained in the new position by the detent portion of the reeds to maintain a live pressure action between the contacts once the jack has been plugged into position.

To further explain, as the jack is moved into position, a spreading of the bare wire multiples is effected by the entering portion of each set of reeds, and as the hump portion of the leading edges of the reeds *26a* and *26c* pass over the respective multiples, the spreading pressure is relaxed and the bare wire multiples engaged by the bent reeds *26a* and *26c* fall into the locking detent provided by the bent portion of those reeds. Inasmuch as each set of reeds is now located in approximately the plane previously occupied by the respective bare wire multiples, due to the flexation of the reeds and multiples, a dimensional interference effect is accomplished and the tendency of the reeds and multiples to return to their normal positions establishes a live pressure action to insure a firm contact between the reeds and multiples.

In a preferred embodiment of the present invention, reference being had to the previously identified copending application Serial No. 226,374, the bare wire multiples 14 are spaced apart .0625 inch. Accordingly, the reeds on each molding strip 24 are spaced apart .125 inch and the strips 24 are so positioned that the reeds of adjacent strips are offset by a distance approximately equal to the spacing between adjacent bare wire multiples, .0625 inch. The offset may be varied, as desired, so that the distortion or flexing of the bare wire multiples and the reeds 26 will be increased or decreased to insure positive contact without permanent distortion between the multiples and the reeds. As is shown in Figure 2, the spacing and offsetting of the reads 26 of the plug-in jack causes flexing of the bare wire multiples 14 into adjacent pairs with pairs of adjacent multiples being received between adjacent offset reeds. The aligning of the reeds *26a*, *26b*, *26c* and *26d*, as shown, insures the proper disposition of the multiples in pairs and the proper flexation thereof to insure pressure contact between the reeds and multiples.

The plug-in jack 20 is preferably provided with a cover 30, the cover being secured to the molding strips 24 by means of screws or bolts 32 passing through the ends of the moldings 24 and the cover 30. The cover 30 is generally U-shaped in cross section and is open at both ends. At one end, generally U-shaped slots 34 are provided in the walls of the cover 30 for the reception of a flexible cable (not shown) which carries a plurality of flexible conductors for connection to the terminals of the reeds 26. Holes 36 are provided in the wall of the cover 30 adjacent the slots 34 for the reception of fasteners or clips for securing the flexible cable to the cover 30. Cover 30 is of such dimension as to have a portion of its side walls projecting beyond the forward or contactor side of the molding strips 24, the portion being indicated at 38. The portion 38 of the cover serves to define a limit of relative movement of the plug-in jack 20 with respect to the bare wire multiples 14, so that the bare wire multiples will be received within the locking detent portion of the S-shaped reeds *26a* and *26c*.

From the foregoing description, it will be apparent that the present invention provides an econocially manufactured plug-in jack capable of ready attachment to and detachment from bare wire multiples or similar parallel wires, the jack providing and insuring high pressure contact between the reeds of the jack and the bare wire multiples.

While we have described what we regard to be a preferred embodiment of our invention, it will be apparent that variations, modifications, changes and rearrangements can be made therein without departing from the scope of the present invention, as defined by the appended claims.

We claim:

1. A plug-in jack comprising a first set of evenly spaced parallel conductors, and a second set of evenly spaced parallel conductors, the spacing between conductors of said second set being the same as the spacing between conductors of said first set, said sets of conductors being positioned parallel to each other with the conductors of one set offset with respect to the conductors of the other set by a distance approximately equal to one-half of the spacing between the conductors of each set, the conductors of one set being curved at one end to provide a locking detent portion adjacent said one end and an inclined leading portion at said one end, said leading portion being so inclined that the offset of the conductors of said two sets is eliminated at their contacting ends.

2. A plug-in jack comprising a first pair of banks of conductors and a second pair of banks of conductors, said banks of conductors being similar and presenting a plurality of evenly spaced conductors, said banks of conductors being positioned parallel to each other with one bank of the first pair being positioned between the banks of the second pair so that the banks of each pair are arranged in alternate order, said banks being so positioned that the conductors of said first pair of banks are aligned with one another and offset with respect to the aligned conductors of said second pair of banks aligned conductors of said first pair of banks being interconnected and aligned conductors of said second pair of banks being interconnected the contacting ends of the conductors of said first pair of banks being aligned in a substantially parallel plane with the corresponding conductors of said second pair of banks.

3. A plug-in jack comprising a first pair of banks of conductors and a second pair of banks of conductors, said banks of conductors being similar and presenting a plurality of evenly spaced conductors, said banks of conductors being positioned with one bank of the first pair being located between the banks of the second pair so that the banks of each pair are arranged in alternate order, said banks being so positioned that the conductors of said first pair of banks are aligned with one another and offset with respect to the aligned conductors of said second pair of banks by a distance approximately equal to one-half the spacing between the conductors of each bank, aligned conductors of said first pair of banks being interconnected and aligned conductors of said second pair of banks being interconnected, the conductors of one pair of banks of conductors being curved at one end to provide a locking detent portion and an inclined leading portion, said leading portion having such inclination that the said one end of the curved conductors is substantially in parallel alignment with the ends of the adjacent conductors of the other pair of banks of conductors.

4. A plug-in jack for effecting connection with a plurality of evenly spaced parallel wires, said jack comprising a first set of evenly spaced parallel reeds having a spacing equal to twice said spacing between adjacent ones of said wires, a second set of evenly spaced parallel reeds having a spacing equal to twice said spacing between adjacent ones of said wires, said sets of reeds being positioned parallel to each other with the reeds of one set offset from the reeds of the other set by a distance approximately equal to the spacing between adjacent wires, whereby the reeds of one set are adapted to contract alternate ones of the wires and the reeds of the other set are adapted to contact the wires not contacted by the reeds of said one set when said sets of reeds are moved into engagement with the wires, the contact end of one set of reeds being straight and the contact end of the other set of reeds being inclined theretoward to permit ready entry of the ends of the corresponding reeds of each set between a corresponding pair of parallel wires.

5. A plug-in jack for effecting connection with a plurality of parallel wires, said jack comprising a first set of parallel reeds, and a second set of parallel reeds, said sets of reeds being positioned parallel to each other for insertion of a reed of each set between a corresponding pair of the wires, one set of reeds having the ends thereof to be inserted between the wires curved, said curved reeds being adapted to flex the wires as said reeds are moved into engagement with the wires to effect pressure contact therewith.

6. A plug-in jack for effecting connection with a plurality of wires, the wires being substantially parallel and having substantially uniform spacing therebetween, said jack comprising a first set of parallel reeds and a second set of parallel reeds, each set of reeds having a spacing between reeds approximately equal to twice the spacing between the wires, said sets of reeds being positioned parallel to each other with the reeds of one set offset with respect to the reeds of the other set by a distance approximately equal to the spacing between the wires, said sets of reeds being adapted to be connected with the wires transversely of the wires as a unit by insertion of a reed of each set between a corresponding pair of the wires, the reeds of one set being curved to provide an inclined leading portion facilitating connection of the jack to the wires and a detent portion serving to detachably lock the jack to the wires after connection.

7. A plug-in jack for effecting connection with a plurality of wires, the wires being substantially parallel and having substantially uniform spacing therebetween, said jack comprising a first set of substantially parallel reeds, and a second set of substantially parallel reeds, each set of reeds having a spacing between reeds of approximately twice the spacing between the wires, said sets of reeds being positioned substantially parallel to each other with the reeds of one set being offset with respect to the reeds of the other set by a distance approximately equal to the spacing between the wires, said sets of reeds being adapted to be connected as a unit with the wires, said sets of reeds extending transversely of the wires when connected therewith, one reed of one set and an adjacent reed of the other set being paired for reception between adjacent wires, the spacing between reeds of each set resulting in flexing of the wires and reception of adjacent wires in pairs between adjacent reeds of each set, the offset of the reeds of said sets resulting in the contacting of alternate wires by the reeds of one set and the contacting of the other wires by the reeds of the other set, the flexing of the wires effecting pressure contact between the wires and the reeds contacting same.

8. A plug-in jack for connection with a plurality of evenly spaced parallel wires, said jack comprising a first set of evenly spaced parallel conductors and a second set of evenly spaced parallel conductors, said sets of conductors having a spacing between conductors equal to approximately twice the spacing between adjacent wires, the conductors of one set having a curved end portion, the curvature being such as to offset the contacting ends of said conductors by a distance equal to approximately one-half the spacing between adjacent conductors in the set, said sets of conductors being positioned parallel to one another with one set offset with respect to the other set to align the free ends of adjacent conductors of the sets in a plane intermediate and parallel to the wires to be engaged thereby, said sets being adapted to be connected to the wires transversely thereof by insertion of adjacent conductors of the sets between adjacent wires, the alignment of the ends of adjacent conductors facilitating the entry of the adjacent conductors between adjacent wires, the wires being paired in two's and flexed due to the relative disposition and spacing of the conductors of both sets and the curvature of the conductors of said one set, whereby pressure contact is established between alternate wires and the conductors of one set and between the other wires and the conductors of the other set.

9. A plug-in jack comprising four molding strips each having a series of evenly spaced conductors secured therein, said conductors having portions extending to both sides of said strips, said strips being positioned side by side with the conductors of the first strip aligned with the conductors of the third strip and the conductors of the second strip aligned with the conductors of the fourth strip and the conductors of the second and fourth strips offset with respect to the conductors of the first and third strips by a distance equal to one-half the spacing between adjacent conductors of each strip, the portions of the conductors of the third strip extending to one side of the strips being bent to extend across the second strip between the conductors of the second strip and into engagement with the aligned conductors of the first strip, the portions of the conductors of the second strip extending to said one side of the strips being bent to extend across the third strip between the conductors of the third strip and into engagement with the aligned conductors of the fourth strip, the portions of the conductors of the four strips extending to the opposite side of the strips serving as contacts, the portions of the conductors of the first strip extending to said one side of the strips constituting terminals respectively for the paired contacts provided by aligned conductors of the first and third strips and the portions of the conductors of the fourth strip extending to said one side of the strips constituting terminals respectively for the paired contacts provided by aligned conductors of the second and fourth strips, the contact ends of two of said pairs of strips being bent to be in parallel alignment with the corresponding ends of the second pair of strips.

10. A plug-in jack comprising a plurality of molding strips having a plurality of spaced parallel conductors secured therein, said strips being positioned side by side with the conductors of alternate strips aligned with one another, the conductors of the other strips being aligned with one another and offset with respect to the conductors of said alternate strips, the aligned conductors of said alternate strips being interconnected and the aligned conductors of said other strips being interconnected, the contacting ends of the conductors of one plurality of strips being bent into a plane parallel with the ends of the corresponding conductors of the other plurality of strips.

11. In telephone apparatus, a bare wire multiple, a plug-in jack adapted to be connected to said multiple transversely thereof, said jack comprising a first set of evenly spaced parallel reeds and a second set of evenly spaced parallel reeds, the reeds of the two sets being offset and the spacing between reeds in each set being twice that of the spacing of the multiples whereby one reed of each set is arranged to be inserted between a corresponding pair of adjacent multiples when associated therewith, one set of reeds being provided at the portion thereof adapted to engage the multiples with an irregular configuration, the irregular configuration being such as to progressively reduce the offset between the reeds of the two sets as the plug is moved into engagement with the wires whereby the multiples are flexed as the jack is moved into connection therewith, the irregular configuration further being such as to present a notch serving as a locking detent for a multiple after the multiple has been flexed to lock the reeds and multiples in pressure contacting relation.

12. In telephone apparatus, a bare wire multiple, a plug-in jack having contacts adapted to be connected to said multiple in a direction normal to said multiple, said jack comprising a first set of evenly spaced reeds and a second set of evenly spaced reeds, the reeds of said first set being straight, the reeds of said second set being formed at the end thereof adapted to contact the multiples to present an inclined leading surface and a locking detent, the sets of reeds being positioned parallel to one another with the reeds of one set offset with respect to the other set, the inclined leading edge on the reeds of said second set being such that the ends of the reeds are aligned parallel with the ends of the reeds of the first set relative to the multiple to be engaged, whereby as said jack is moved toward said multiple aligned reeds of each set are received between adjacent multiples and one multiple is acted upon by the inclined leading edge of one of the reeds to force the other multiple into engagement with the straight reed of the aligned reeds and to flex both multiples to effect pressure contact between the respective reeds and multiples, said one multiple being engaged by the locking detent of said one of the reeds whereby said jack is locked to said bare wire multiple with the reeds and multiples in pressure contact.

13. A plug-in-jack comprising at least a first pair of banks of conductors and a second pair of banks of conductors, said banks of conductors being similar and presenting a plurality of evenly spaced conductors, said banks of conductors being positioned parallel to each other with one bank of the first pair being positioned between the banks of the second pair so that the banks of each pair are arranged in alternate order, said banks being so positioned that the conductors of said first pair of banks are aligned with one another and offset with respect to the aligned conductors of said second pair of banks, and the contacting ends of the conductors of said first pair of banks being aligned in a substantially parallel plane with the corresponding conductors of said second pair of banks.

14. A plug-in-jack for effecting connection with a plurality of parallel wires, said jack comprising a first set of reeds adapted to be mounted in contacting relationship with at least one of said wires, pressure contacting means comprising at least one other reed, the contacting end of said other reed being inclined with respect to one of the reeds of said first set for flexing at least one of the other said wires as said inclined end engages said corresponding wire to effect pressure contact between each of said reeds and the wire in contact therewith.

15. A plug-in-jack for effecting connection with a plurality of parallel wires, said jack comprising a first set of reeds adapted to be mounted in contacting relationship with at least one of said wires, a second set of reeds, the contacting ends of said reeds of said second set being inclined with respect to said reeds of said first set for flexing at least one of the other said wires as said inclined ends engage said wire to effect pressure contact between each of said reeds and the wire in contact therewith.

References Cited in the file of this patent

UNITED STATES PATENTS

| | | |
|---|---|---|
| 2,021,329 | Reynolds | Nov. 19, 1935 |
| 2,108,031 | Acuff | Feb. 15, 1938 |
| 2,192,899 | Edmonson | Mar. 12, 1940 |
| 2,214,907 | Lomax et al. | Sept. 17, 1940 |
| 2,326,647 | Horton | Aug. 10, 1943 |
| 2,461,616 | Walter | Feb. 15, 1949 |
| 2,481,181 | Walter | Sept. 6, 1949 |
| 2,640,183 | Arthur | May 26, 1953 |